(12) United States Patent
Lee

(10) Patent No.: US 7,118,122 B2
(45) Date of Patent: Oct. 10, 2006

(54) INVISIBLE PASSENGER AIRBAG DOOR

(75) Inventor: Kang Wook Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 378 days.

(21) Appl. No.: 10/716,707

(22) Filed: Nov. 20, 2003

(65) Prior Publication Data

US 2005/0077707 A1    Apr. 14, 2005

(30) Foreign Application Priority Data

Oct. 14, 2003    (KR) ...................... 10-2003-0071546

(51) Int. Cl.
*B60R 21/20*    (2006.01)
(52) U.S. Cl. .................................. 280/728.3; 264/400
(58) Field of Classification Search ............. 280/728.3, 280/732, 728.1; 264/36.1
See application file for complete search history.

(56) References Cited

U.S. PATENT DOCUMENTS 5,728,342 A    3/1998   Wirt et al.
6,174,470 B1   1/2001   Plymale et al.
6,267,918 B1 * 7/2001   Bauer .................... 264/400
6,565,115 B1   5/2003   Streck \* cited by examiner

*Primary Examiner*—Paul N. Dickson
*Assistant Examiner*—Tiffany L. Webb
(74) *Attorney, Agent, or Firm*—Greenblum & Bernstein, P.L.C.

(57) ABSTRACT

The present invention relates to an invisible passenger airbag door, and more particularly, to an invisible passenger airbag door that is constructed by defining an incision portion through processing of micro holes on an instrument panel. In the invisible passenger airbag door, an incision portion is constructed at a portion of an instrument panel where a passenger airbag is installed, by processing micro holes at a corresponding portion of an inner surface of the instrument panel to conform to an outer contour of the passenger airbag. The micro holes constructing the incision portion are filled with a filling material that comprises fine particles with no viscosity.

4 Claims, 3 Drawing Sheets

INVISIBLE PASSENGER AIRBAG DOOR

RELATED APPLICATIONS

The present disclosure relates to subject matter contained in Korean Application No. 10-2003-0071546, filed on Oct. 14, 2003, which is herein expressly incorporated by reference its entirely.

BACKGROUND OF THE INVENTION

1. Field of Invention

The present invention relates to an invisible passenger airbag door, and more particularly, to an invisible passenger airbag door capable of preventing the deterioration of an external appearance due to a line constructed of micro holes defining an airbag door that is formed by processing the micro holes on an instrument panel to define an incision portion, and preventing a phenomenon of tear of the instrument panel off the line upon deployment of the airbag in a case where the depths of or intervals between the micro holes are not proper.

2. Description of the Prior Art

Generally, passenger restraint systems that are employed in automobiles etc. to ensure the safety of passengers include seat belts, airbag systems, and the like.

The airbag system is to prevent the head of a driver or passenger from colliding against a front structure in an interior passenger room of an automobile due to inertia upon occurrence of an automobile accident. As shown in FIG. 1, a driver airbag 1 for protecting a driver, and a passenger airbag 2 for protecting an occupant in a front passenger seat are commonly used. A side airbag 3 is also used for coping with a side impact in an automobile, if necessary.

In such an airbag system, the driver airbag 1 is mainly installed in the center of a steering wheel, while the passenger airbag 2 is installed by placing an airbag module behind the instrument panel. Thus, an additional door is constructed by forming an incision line in the instrument panel so that the door can be easily opened upon operation of the passenger airbag 2.

Recently, there is a tendency for such a door for the passenger airbag 2 to be constructed in an invisible type so that an indication of the installation of the passenger airbag 2 cannot be seen from the outside to prevent aesthetic deterioration. In this case, micro holes 5a are formed using a laser or mechanically in a portion of a surface of the instrument panel 4 corresponding to the airbag door, as shown in FIGS. 2 and 3. Although the micro holes cannot be normally identified from the outside, an incision portion 5 constructed of the processed micro holes 5a is incised and the airbag is then inflated when the airbag is operated due to the occurrence of an impact. In FIG. 3, an upper surface corresponds to an outer surface of the instrument panel 4 viewed by an occupant.

In a case where the depths of the micro holes become large or the intervals between the micro holes become small upon processing the micro holes in such a conventional passenger airbag door, however, there is a problem in that an incision line constructed of the micro holes for defining the incision portion may be seen from the outside.

Further, if the depths of and intervals between the micro holes are not proper, it is likely that the instrument panel may be torn at portions thereof off the incision line defining the incision portion when the airbag is deployed. There is a high probability of the occurrence of such a phenomenon, particularly at low temperature.

SUMMARY OF THE INVENTION

The present invention is conceived to solve the aforementioned drawbacks or problems in the prior art. An object of the present invention is to provide an invisible passenger airbag door capable of preventing the deterioration of an external appearance due to a line constructed of micro holes defining the airbag door, and preventing a phenomenon of tear of an instrument panel off the line upon deployment of a relevant airbag in a case where the depths of or intervals between the micro holes are not proper.

According to the present invention for achieving the object, there is provided an invisible passenger airbag door, comprising an incision portion constructed at a portion of an instrument panel where a passenger airbag is installed, by processing micro holes at a corresponding portion of an inner surface of the instrument panel to conform to an outer contour of the passenger airbag; and a filling material which is filled into the micro holes constructing the incision portion and comprises fine particles with no viscosity.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
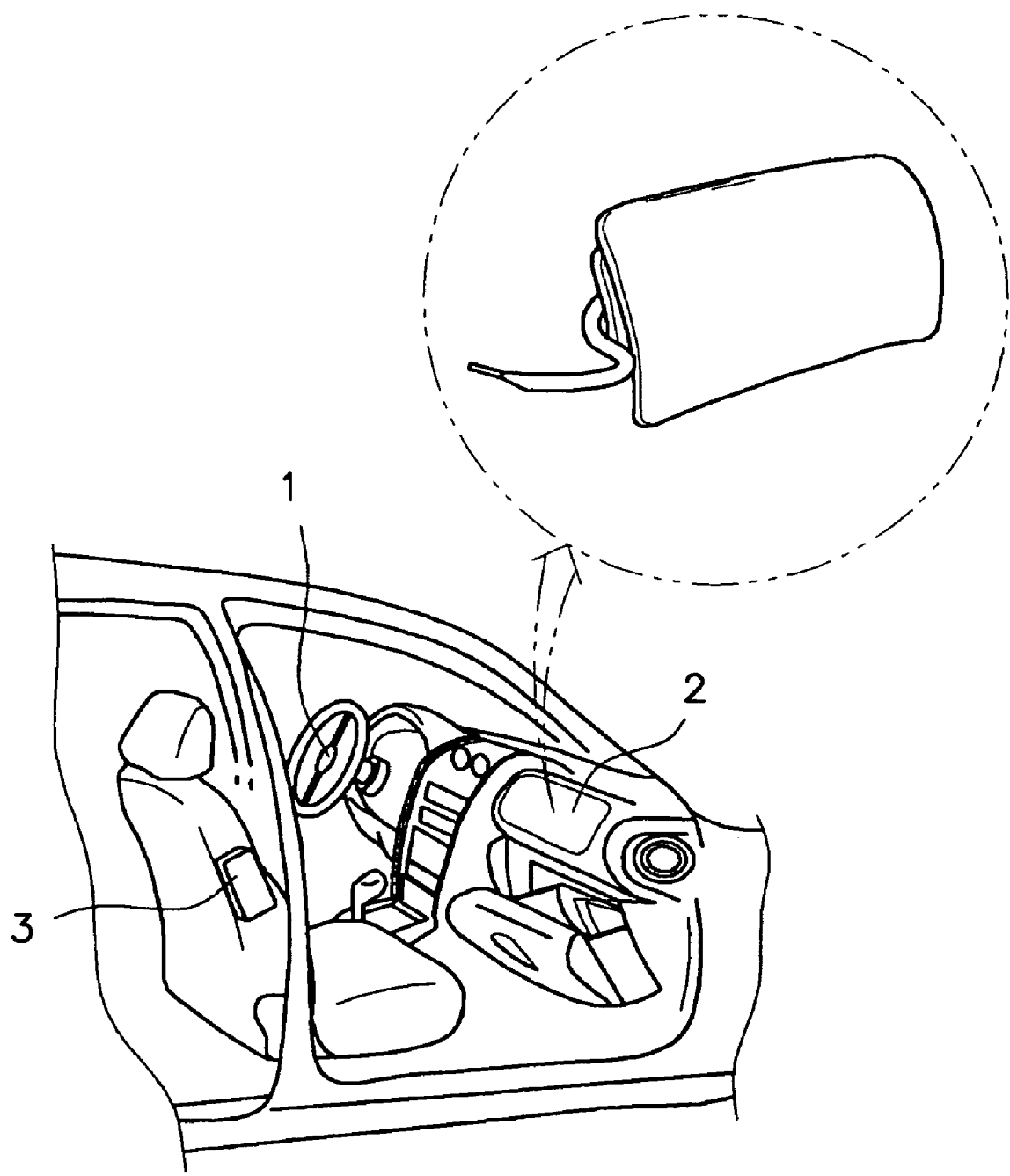
FIG. 1 is a schematic view showing a general airbag system.
Figure 2:
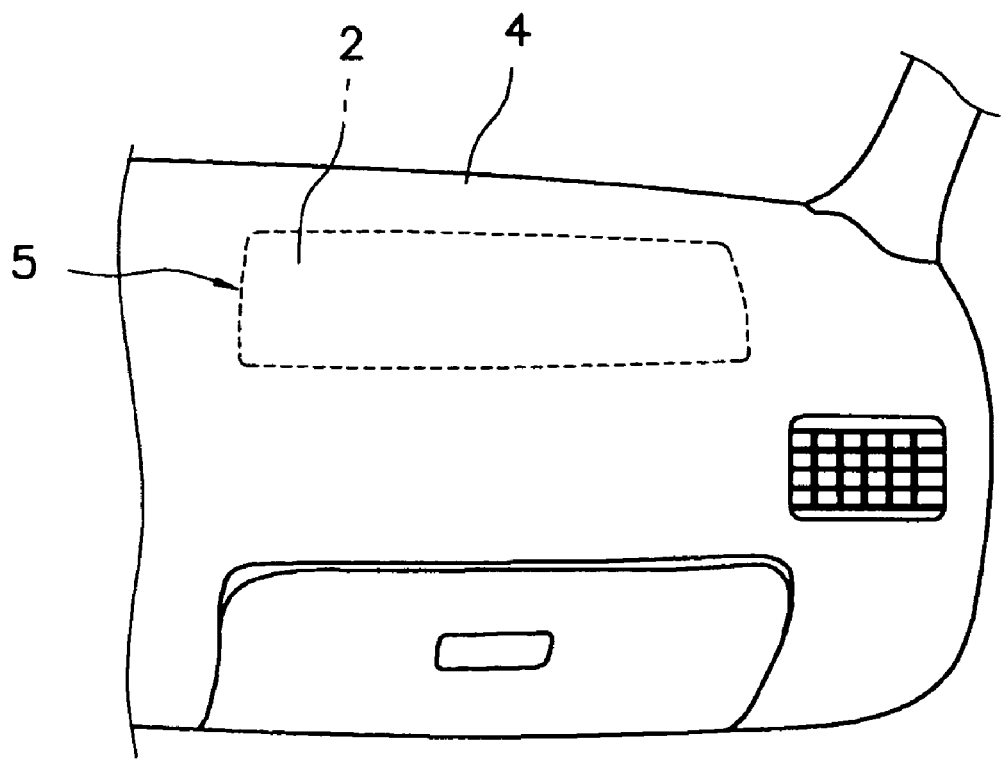
FIG. 2 is a perspective view showing a conventional invisible passenger airbag door.
Figure 3:
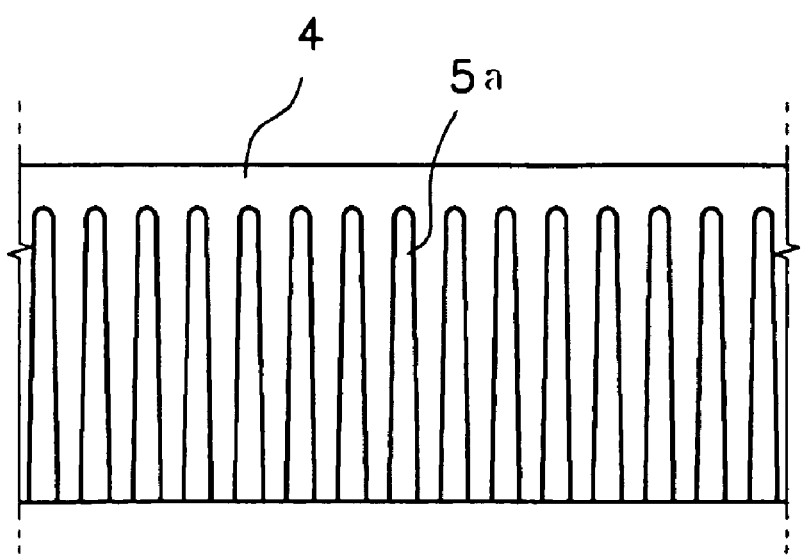
FIG. 3 is a sectional view of the conventional invisible passenger airbag door.
Figure 4:
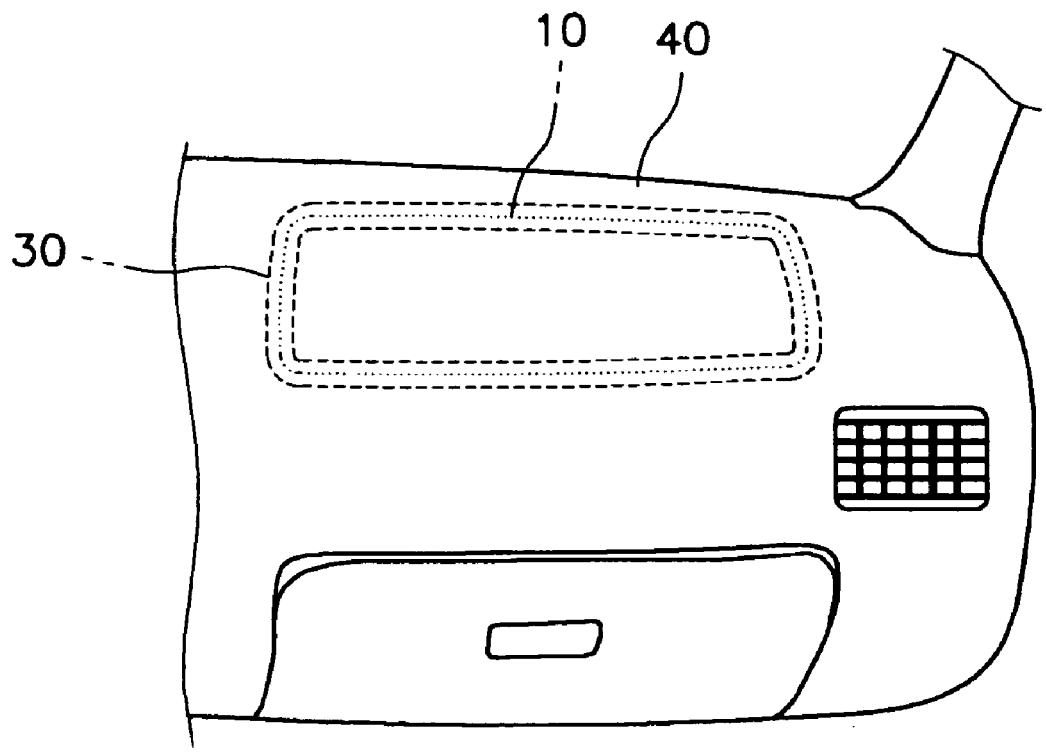
FIG. 4 is a perspective view of an invisible passenger airbag door according to an embodiment of the present invention.
Figure 5:
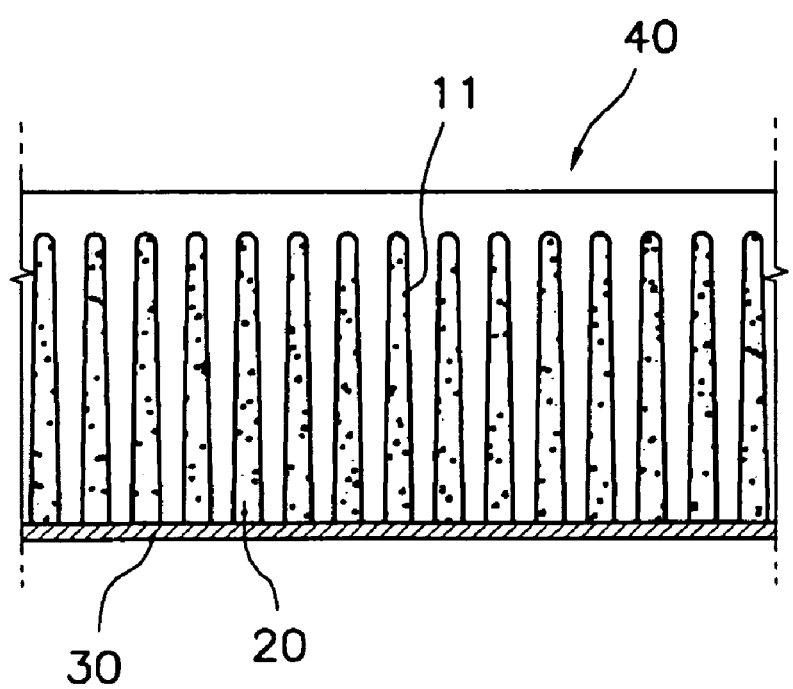
FIG. 5 is a sectional view of the invisible passenger airbag door according to the embodiment of the present invention.

FIG. 4 is a perspective view of an invisible passenger airbag door according to an embodiment of the present invention, and FIG. 5 is a sectional view of the invisible passenger airbag door according to the embodiment of the present invention. In the embodiment of the present invention, an incision portion 10 is constructed at a portion of an instrument panel 40 where a passenger airbag (not shown) is installed, by processing micro holes 11 at a corresponding portion of an inner surface of the instrument panel 40 to conform to an outer contour of the passenger airbag. The micro holes 11 constructing the incision portion 10 are filled with a filling material 20 that comprises fine particles with no viscosity.

Although the incision portion 10 constructed of the micro holes 11 is formed on the inner surface of the instrument panel 40 in the case where the invisible passenger airbag door is formed, it may be constructed on the outer surface of the instrument panel, if necessary.

The filling material 20 may comprise any particles that do not have their own stiffness and thus do not exert influence on the deployment of the passenger airbag. Carbon powder is preferably used as the filling material.

Further, a sealing tape 30 is attached over the micro holes 11 filled with the filling material 20 to hermetically seal the micro holes, thereby preventing the filling material 20 from leaking out from the micro holes 11 of the incision portion 10.

Preferably, a tape that does not interfere with the deployment of the passenger airbag is used as the sealing tape 30. More preferably, a paper tape is used as the sealing tape.

Hereinafter, the operation and effects of the present invention will be described with reference to FIGS. 4 and 5.

According to the present invention described above, the filling material 20 is filled into the incision portion 10 constructed of the micro holes 11, which are formed by means of laser processing or machining, in order to form the invisible passenger airbag door. Thus, it is possible to prevent the deterioration of the external appearance due to the fact that the incision portion 10 is seen from the outside, and to simultaneously prevent the phenomenon that the instrument panel 40 is not torn along the incision portion 10 upon deployment of the passenger airbag.

Generally, the incision portion 10 constructed of the micro holes 11 is formed on the inner surface of the instrument panel 40. Thus, the micro holes 11 themselves cannot be seen from the outside. However, if the depths of the micro holes 11 become large or the intervals therebetween become small, a passenger may view the incision portion 10 constructed of the micro holes 11.

In contrast, when the filling material 20 such as carbon powder is filled into the incision portion 10 constructed of the micro holes 11 in accordance with the present invention, it is possible to prevent the phenomenon that the passenger views the incision portion, even though the intervals between the micro holes 11 become sufficiently small. Particularly, when black powder such as carbon (graphite) powder is filled into the incision portion, such effects are more remarkable.

Any powder with non-coherent particles may be used as the filling material 20. Since such powder does not have its own stiffness, the powder allows the effects of the present invention to be obtained while it does not exert influence on the deployment of the airbag.

Meanwhile, since the sealing tape 30 is not normally exposed to the outside, the sealing tape does not affect the external appearance while it is attached over the micro holes 11 to hermetically seal the micro holes, thereby preventing the filling material 20 from leaking out. To prevent the influence of the sealing tape on the deployment of the airbag, a paper tape is preferably used as the sealing tape.

According to the invisible passenger airbag door of the present invention, it is possible to prevent the deterioration of the external appearance due to the line constructed of the micro holes defining the incision portion of the passenger airbag door, and to prevent the phenomenon of tear of the instrument panel off the line upon deployment of the airbag in the case where the depths of or intervals between the micro holes are not proper.

The embodiment of the present invention described above is merely an example for specifically explaining the technical spirit of the invention. Therefore, the scope of the invention is not limited to the embodiment illustrated in the accompanying drawings.

What is claimed is:

1. An invisible passenger airbag door, comprising:
   an incision portion constructed at a portion of an instrument panel where a passenger airbag is installed, by processing micro holes at a corresponding portion of an inner surface of the instrument panel to conform to an outer contour of the passenger airbag; and
   a filling material which is filled into the micro holes constructing the incision portion and comprises fine particles.

2. The invisible passenger airbag door as claimed in claim 1, wherein the filling material comprises carbon powder.

3. The invisible passenger airbag door as claimed in claim 1, wherein a sealing tape is attached over the micro holes filled with the filling material to hermetically seal the micro holes.

4. The invisible passenger airbag door as claimed in claim 3, wherein the sealing tape is a paper tape.

* * * * *